US012722086B2

(12) United States Patent
McCoy et al.

(10) Patent No.: US 12,722,086 B2
(45) Date of Patent: Sep. 1, 2026

(54) SYSTEMS AND METHODS FOR GENERATIVE GAME WORLD POPULATION AND NESTED TEMPLATE GENERATION

(71) Applicant: Sony Interactive Entertainment Inc., Tokyo (JP)

(72) Inventors: Charles McCoy, San Diego, CA (US); True Xiong, San Diego, CA (US)

(73) Assignee: SONY INTERACTIVE ENTERTAINMENT INC., Tokyo (JP)

( * ) Notice: Subject to any disclaimer, the term of this patent is extended or adjusted under 35 U.S.C. 154(b) by 198 days.

(21) Appl. No.: 18/492,276

(22) Filed: Oct. 23, 2023

(65) Prior Publication Data

US 2025/0128172 A1 Apr. 24, 2025

(51) Int. Cl.
*A63F 13/67* (2014.01)
*A63F 13/47* (2014.01)
*A63F 13/79* (2014.01)

(52) U.S. Cl.
CPC .............. *A63F 13/67* (2014.09); *A63F 13/79* (2014.09); *A63F 13/47* (2014.09)

(58) Field of Classification Search
None
See application file for complete search history.

(56) References Cited

U.S. PATENT DOCUMENTS 12,330,066 B1 * 6/2025 Keppler .................. A63F 13/35
2011/0265019 A1 10/2011 Ecevit et al.
(Continued)

FOREIGN PATENT DOCUMENTS

CN 114100142 A 3/2022
EP 4082641 A1 11/2022
(Continued)

OTHER PUBLICATIONS

"Creating Custom World Generation Settings For Your Don't Starve Together Server", Nodecraft, Available online at: https://nodecraft.com/support/games/dont-starve-together/creating-custom-world-generation-settings-for-your-dont- starve-together, Feb. 24, 2020, 6 pages.
(Continued)

*Primary Examiner* — Ronald Laneau
(74) *Attorney, Agent, or Firm* — Kilpatrick Townsend & Stockton LLP

(57) ABSTRACT

System, process, and device configurations are provided for generative game world population including player customized generation with a user interface and nested templates. A method can include determining elements for populating an electronic game area using player data and a template. Templates can include one or more nested layers including constraints and parameters for generating or populating game elements. Populating electronic game areas may include use of a game world generation model trained to generate a new game area or elements to appear as part of an electronic game. Game world population may be customized based on player input, such as a variable control input to provide preferences for game parameters. Game world generation may be based on sublayers of a template providing a boundary and parameters for generation. Templates may be used to inherit or override game objects and game parameters during game world population.

20 Claims, 8 Drawing Sheets

(56) References Cited

U.S. PATENT DOCUMENTS

| | | | | |
|---|---|---|---|---|
| 2013/0172084 | A1 | 7/2013 | Cudak et al. | |
| 2014/0171191 | A1 | 6/2014 | Cox et al. | |
| 2019/0184285 | A1 | 6/2019 | Schrager | |
| 2020/0312003 | A1* | 10/2020 | Borovikov | G06N 7/01 |
| 2020/0380788 | A1 | 12/2020 | Hutten et al. | |
| 2020/0406144 | A1 | 12/2020 | Estanislao | |
| 2022/0088478 | A1* | 3/2022 | Dicken | A63F 13/5372 |
| 2022/0143509 | A1 | 5/2022 | Griesemer et al. | |
| 2025/0128167 | A1* | 4/2025 | McCoy | A63F 13/69 |
| 2025/0128171 | A1* | 4/2025 | McCoy | A63F 13/67 |

FOREIGN PATENT DOCUMENTS

| | | | |
|---|---|---|---|
| GB | 2609197 | A | 2/2023 |
| WO | 2019169068 | A1 | 9/2019 |

OTHER PUBLICATIONS

"World Customization/Don't Starve Together", Don't Starve Wiki, Oct. 9, 2021, 52 pages.

U.S. Appl. No. 18/492,197, "Final Office Action", mailed Jan. 16, 2026, 13 pages.

U.S. Appl. No. 18/492,197, "Non-Final Office Action", mailed Sep. 17, 2025, 12 pages.

U.S. Appl. No. 18/492,247, "Non-Final Office Action", mailed Dec. 18, 2025, 19 pages.

Dang et al., "GANSlider: How Users Control Generative Models for Images Using Multiple Sliders with and without Feedforward Information", Conference on Human Factors in Computing Systems, April 29-May 5, 2022, 15 pages.

Liapis et al., "Orchestrating Game Generation", Institute of Electrical and Electronics Engineers Transactions on Games, vol. 11, No. 1, Mar. 1, 2019, pp. 1-21.

International Application No. PCT/IB2024/060344, "International Preliminary Report on Patentability", mailed May 7, 2026, 10 pages.

International Application No. PCT/IB2024/060344, "International Search Report and Written Opinion", mailed Feb. 13, 2025, 13 pages.

International Application No. PCT/IB2024/060345, "International Preliminary Report on Patentability", mailed May 7, 2026, 8 pages.

International Application No. PCT/IB2024/060345, "International Search Report and Written Opinion", mailed Mar. 3, 2025, 9 pages.

International Application No. PCT/IB2024/060347, "International Preliminary Report on Patentability", mailed May 7, 2026, 8 pages.

International Application No. PCT/IB2024/060347, "International Search Report and Written Opinion", mailed Mar. 10, 2025, 10 pages.

Petrovas et al., "Procedural Video Game Scene Generation by Genetic and Neutrosophic WASPAS Algorithms", Applied Sciences, Available online at: https://doi.org/10.3390/U.S. Appl. No. 12/020,772, filed Jan. 13, 2022, 16 pages.

Summerville et al., "Procedural Content Generation via Machine Learning (PCGML)", Available online at: https://doi.org/10.48550/arXiv.1702.00539, May 7, 2018, pp. 1-15.

* cited by examiner

SYSTEMS AND METHODS FOR GENERATIVE GAME WORLD POPULATION AND NESTED TEMPLATE GENERATION

CROSS-REFERENCE TO RELATED APPLICATION

This application is concurrently filed with U.S. patent application Ser. No. 18/492,197 titled SYSTEMS AND METHODS FOR GENERATIVE GAME WORLD POPULATION AND GAME ELEMENT TAGS, and U.S. patent application Ser. No. 18/492,247 titled SYSTEMS AND METHODS FOR GENERATIVE GAME WORLD POPULATION AND PLAYER CUSTOMIZATION, the specifications of which are hereby expressly incorporated by reference in their entirety.

FIELD

The present disclosure is directed to interactive entertainment and electronic video gaming, including gaming device operations, processes, configurations, user interface control and control device configurations, and generative processes for the population of game worlds.

BACKGROUND

Computer and console game titles have been developed in many styles for different gaming systems and platforms. Games and content are often developed for display in a two-dimensional format that include presentation of games in a variety of formats.

As game systems and networking features evolve to include increased processing power and display quality, gaming content also improves with development of rich features and graphics. There is a desire to provide customization and tailoring to users for gaming content. Conventional development processes may limit the ability of developers to provide game content suitable to all users. In addition, many games are developed with a fixed mapping and game architecture. Some existing games allow for users to manually select features, such as a character or level. These existing games may be limited in the ability to generate game elements. Accordingly, there is a need and a desire for game systems and devices to provide user ability to control gaming content. There is also need and a desire for gaming systems to improve controllability of device operation including improving device interface control and game world population.

BRIEF SUMMARY OF THE EMBODIMENTS

Disclosed and described herein are systems, methods and configurations for generative game world population. In one embodiment, a method includes detecting, by a device, player data for at least one player of an electronic game. The method includes determining, by the device, at least one element for populating a game area of the electronic game using the player data and a template, wherein the template includes at least one nested layer and each nested layer of the template includes a constraint for generating the at least one element. The method includes outputting, by the device, game data with the at least one element for populating the game area.

In one embodiment, detecting player data includes detecting at least one input control for a multiplayer game and identifying an in-game preference for the at least one player of the electronic game based on in-game player interactions with elements of the electronic game.

In one embodiment, detecting player data includes detecting at least one input control for a user interface of the electronic game, the user interface including a plurality of graphical slider controls to define user preferences.

In one embodiment, detecting player data includes detecting at least one input control to a user interface including at least one variable control input configured to define at least one game parameter.

In one embodiment, the nested template provides at lease on constraint for generating a game area, game object in the game area and at least one subarea for the game area.

In one embodiment, the nested template includes a plurality of sublayers, each sublayer providing a boundary for generation of a game element for the electronic game.

In one embodiment, determining the at least one element includes setting at least one style for the at least one element using the template, wherein the template provides at least one of inheriting and overriding an object of the electronic game.

In one embodiment, the template is generated based on detected player data.

In one embodiment, determining the at least one element includes generating a new challenge for the electronic game based on the player data and template.

In one embodiment, outputting game data for the electronic game includes output of the at least one element during a game session to a first player and a second player of the electronic game.

Another embodiment is directed to a device configured for generative game world population. The device includes an interface and memory storing executable instructions and a controller, coupled to the interface and memory. The controller is configured to detect player data for at least one player of an electronic game. The controller is also configured to determine at least one element for populating a game area of the electronic game using the player data and a template, wherein the template includes at least one nested layer and each nested layer of the template includes a constraint for generating the at least one element. The controller is configured to output game data with the at least one element for populating the game area.

Other aspects, features, and techniques will be apparent to one skilled in the relevant art in view of the following detailed description of the embodiments.

BRIEF DESCRIPTION OF THE DRAWINGS

The features, objects, and advantages of the present disclosure will become more apparent from the detailed description set forth below when taken in conjunction with the drawings in which like reference characters identify correspondingly throughout and wherein.

DETAILED DESCRIPTION OF THE EXEMPLARY EMBODIMENTS

Overview and Terminology

Figure 1:
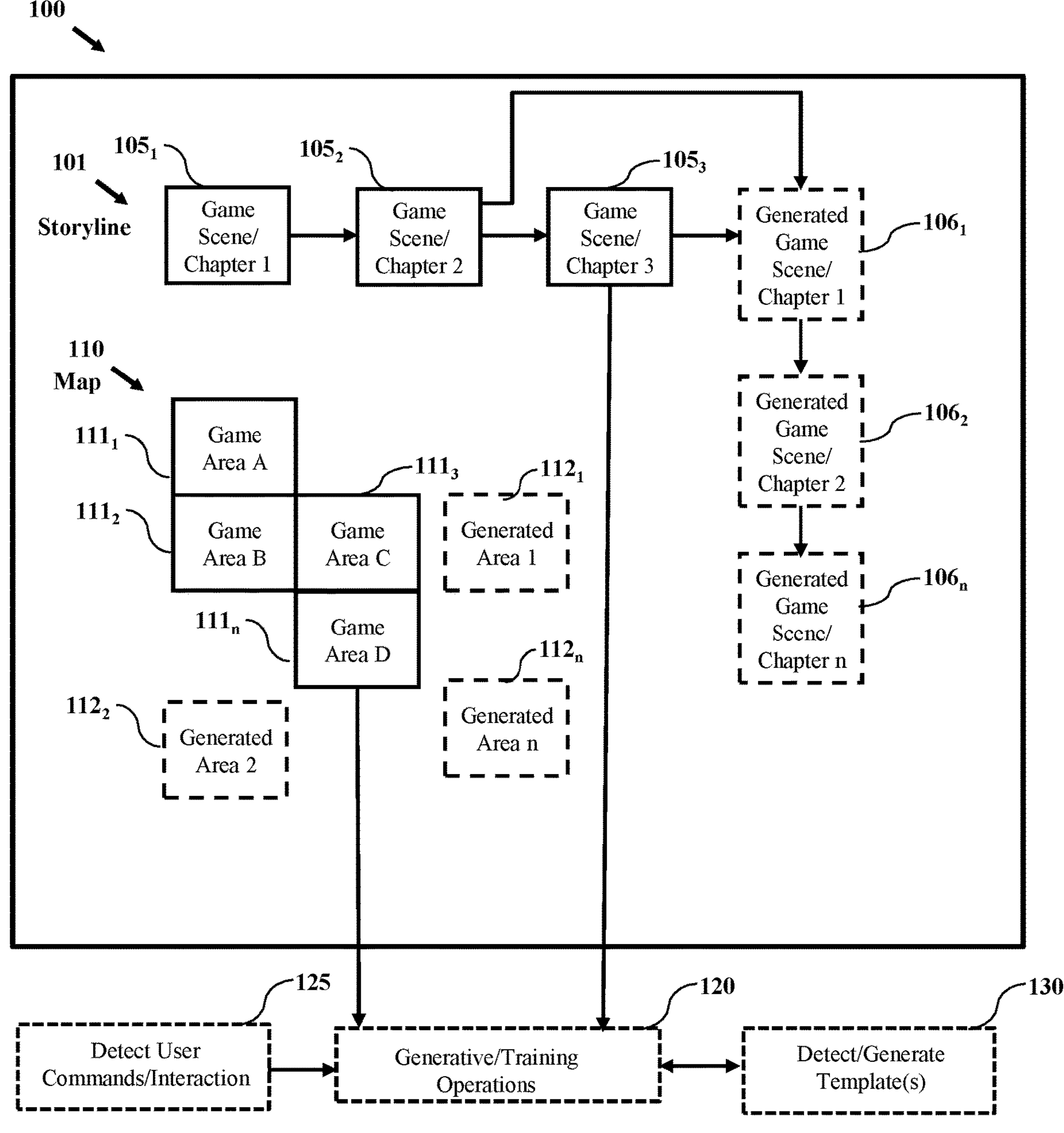
FIG. 1 is a graphical representation of generative game world population according to one or more embodiments.

One aspect of the disclosure is directed to generative game world population. Embodiments are directed to gaming systems which may include consoles, processors or servers that generate game content. Processes, system configurations and device configurations according to embodiments are provided to populate game areas, such as a game area of an existing game. Processes and device configurations may be configured for generative operations including one or more of generating game object, populating game areas, generating new game areas and stylizing one or more objects and game areas of an electronic game. Embodiments provide operations and device configurations that allow for population and/or of elements using one or more templates. According to embodiments and as described herein, templates may be nested to include definitions, constraints and/or parameters to allow for generation of game elements. Templates may be nested including one or more layers, wherein each layer may include one or more layers and objects. A template may determine that one or more tags are attached to content generated from the template, which may impose constraints on content that is nested within the generated content. Nested layers may provide data and information to aid and improve generation of elements. Nested templates may have a configuration or structure that allows for identification of elements that fit or comply with an electronic game.

According to embodiments, configurations are provided for devices to use templates for generation of game objects and generative game world population. Game elements may be generated as nested elements to provide different levels of detail. Features, characteristics and associations of objects may be based on a hierarchical nesting of templates to generate the game elements. According to embodiments, templates may be used to generate new game areas. According to embodiments, templates may be used which account for aspects of a game and may include elements inherited from an electronic game. Aspects of a game template being rendered may be inherited from an existing game element or may include an override of one or more aspects of an existing game element.

According to embodiments, templates used herein may be generative game templates. Templates may include one or more constraints for generating game elements. The constraints may ensure that elements fit with the enclosing game element, work with game mechanics/operations, and/or reflects player preferences. According to embodiments a game generation model may configure generated elements to comply with constraints of a template when generating the game element from the template. Templates can specify boundaries of elements and objects generative operations are performed. Generative operations using a template can range from specifying a detail exactly, to giving bounds as to what is allowed or not allowed for a detail, to allowing the generative operations free range for determining a detail. According to embodiments, templates can be updated, or new templates can be created based on analysis of player interactions with generated game elements.

Embodiments described herein include processes, device configurations and systems for generating game worlds and for populating one or more areas of the game. According to embodiments, generation of a game world may include detecting of player data including player preference through one or more of a user interface and detection of player input. Player preferences may be determined for a plurality of players, which can be used to generate game content that is customized to provide the best game play for the group of players.

Game areas may have one or more sub-areas, within a game area. According to embodiments, generative open world population can include configuration of game world areas, game world sub-areas and/or game world elements. Generative open world population may include generating, such as creating a new game area and/or game sub-area for the electronic game. The game world areas may have a structure and/or relationship. For example, a first level, level 1, is played prior to a second level, level 2. Similarly, a planet or landscape is played first and then a player may access a second planet or second level. Game world areas may have a structural relationship to each other by way of layers, map locations and an arrangement relative to one another. Operations for generating game areas may be performed for generation of one or more game worlds for an electronic game. By generating a game area and/or game world, players of the electronic game may interact with video and gaming content that may be generated based on the player or group of players and to allow a new game environment generated after game design. By way of example, game designers may generate a game including multiple levels or games areas. Embodiments include processes to add one or more additional levels to the game.

According to embodiments processes and device configurations provide one or more operations for player customization of an electronic game. With generative operations, game object generation may be improved for a player by providing a user interface including one or more variable controls for a plurality of game features. By providing variable controls, such as sliders, a user may control the degree of influence of one or more factors. For generative operations configured to generate a vast number of outputs, controllability may provide the user with the ability to personally customize generative operations and game data that is output.

Population of a game world may include generation of game elements as part of game design, part of a game engine, game server operation and based on game player input. Game world population may apply to configuring elements and/or generating elements. Elements of a game include player controlled objects (e.g., characters), non-player controlled elements (e.g., non-player characters, opponents, borders, paths, tracks, etc.), visual elements (background, levels, maps, etc.), game storyline, game structure (e.g., game maps, levels, arrangement), audio output features, themes for display, game locations (e.g., landscape, outer space, space ship, race track, etc.) and game elements in general. According to embodiments, generative game world population includes using one or more machine learning models (ML). ML models used herein may be generated and used to for generative population of game worlds, including artificial intelligence (AI) models configured to populate game worlds and game elements. Operations and processes described herein for generative game world population may provide generative AI open world population using generative AI for the population of game worlds.

According to embodiments processes, device configurations and systems for generating of game worlds and for populating one or more areas of the game may including generating one or more storylines elements for an electronic game. An electronic game may include one or more characters and one or more storyline elements. For example the storyline may require a character to accumulate or locate items before challenging a game boss. Alternatively, the storyline may include details of characters, including player controlled and non-player characters. Embodiments can modify a storyline to include populating one or more details of the storyline. According to embodiments, embodiments can include generating a storyline and inserting the storyline in the electronic game. Storyline generation according to embodiments can include recognizing character actions or endings (e.g., defeated character, demolished game object etc.).

According to embodiments, processes are provided for generating game worlds and populating game worlds based on one or more of player interest and player actions within a game, such as in-game controls. By using player actions and player preferences, an electronic game may be presented based on player actions in the game. As such, player actions can be detected and used to effect one or more of game structure and game storyline. In addition, player interactions and input commands of multiple players may be detected and used to generate one or more of a game area and game storyline.

Embodiments are also directed to systems, devices and methods for generating a model and training a device using the model for population of a game world. Operations may be performed during training to identify characteristics of a game and/or players interactions with game such that population of the game world includes one or more of a consistent design, them or logic. The model may be generated to populate an existing game area.

As used herein, the terms "a" or "an" shall mean one or more than one. The term "plurality" shall mean two or more than two. The term "another" is defined as a second or more. The terms "including" and/or "having" are open ended (e.g., comprising). The term "or" as used herein is to be interpreted as inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

Reference throughout this document to "one embodiment," "certain embodiments," "an embodiment," or similar term means that a particular feature, structure, or characteristic described in connection with the embodiment is included in at least one embodiment. Thus, the appearances of such phrases in various places throughout this specification are not necessarily all referring to the same embodiment. Furthermore, the particular features, structures, or characteristics may be combined in any suitable manner on one or more embodiments without limitation.

EXEMPLARY EMBODIMENTS

FIG. 1 is a graphical representation of generative game world population according to one or more embodiments. FIG. 1 illustrates an electronic game 100 including a game storyline 101 including a plurality of scenes $\mathbf{105}_{1\text{-}n}$ and game structure 110 including a plurality of game areas $\mathbf{111}_{1\text{-}n}$. According to embodiments, processes and device configurations are configured for generative game world population of an electronic game, such as electronic game 100 to add and/or modify one or more game elements. Generative game world population of electronic game 100 can include adding and/or modifying game storyline 101, such as one or more of scenes $\mathbf{105}_{1\text{-}n}$. Generative game world population can include determining one or more storyline elements, such as scenes $\mathbf{106}_{1\text{-}n}$. When generated, scenes $\mathbf{106}_{1\text{-}n}$ may be added to storyline 101, and the arrangement and order of scenes $\mathbf{106}_{1\text{-}n}$ may be added in addition to and/or in between one or more of game scenes $\mathbf{105}_{1\text{-}n}$. According to embodiments, generative game world population of electronic game 100 can include adding and/or modifying elements to game areas, such as game areas $\mathbf{111}_{1\text{-}n}$. Generative game world population can include determining one or game areas (new game areas), such as game areas $\mathbf{112}_{1\text{-}n}$. When generated, game areas $\mathbf{112}_{1\text{-}n}$ may be added to game structure 110, and the arrangement and order of game areas $\mathbf{112}_{1\text{-}n}$ may be added in addition to and/or in between one or more of game areas $\mathbf{111}_{1\text{-}n}$.

[Question for Inventors, when a New Game Area is Added Please Identify Relationship Or Mechanism for Linking New Game Area to Existing Game Map]

According to embodiments, generative game world population may include determining at least one element for populating electronic game areas using a game world generation model. According to embodiments, a device may perform generative and/or training operations at block 120 for electronic game 100 using a game world generation model. According to embodiments, a game world generation model may be configured to generate, populate and configure one or more elements of electronic game 100. Configuring an element of an electronic game 100 may be based on a game element tag identifying the element for configuration. Alternatively or in combination, configuration of an element of an electronic game 100 may be based on a game area that may be generated by the game world generation model. Generation of a new area can include populating the area with one or more elements or constraints. According to embodiments, generative and/or training operations at block 120 may include one or more operations to identify elements of an electronic game, generate new areas and/or configure one or more game areas of electronic game 100. According to embodiments, generative and/or training operations at block 120 may be based on one or more detected user commands and/or interactions at block 125. Generative game world population may be based on one or more commands. By way of example, commands may be an input command for one or more of game engine command, game design command, game server command and game player command to populate at least one element of a game session. By way of example, a game engine command may be an instruction of electronic game 100 to generate a new game area or populate one or more existing areas of the game. During game design, a device may receive a game world input generation command by way of a user interface to generate a new game area or populate game areas. During game play, a game world generation input command may be received from users, such as players of the game, to generate a new game area. Similarly, one or more devices providing the electronic game, such as a server, may generate a game world generation input command to generate game areas and/or populate game areas. Generative game world population may be based on one or more templates detected and/or generated at optional block 130. According to embodiments, an electronic game may include one or more templates for game areas for populating an area of an electronic game. According to embodiments, a template may be detected for at least one game area of an electronic game. According to embodiments, generative game world templates may be generated for electronic game 100 to allow for generation of one or more area, game objects and game world population to conform with one or more aspects of a game, such as game mechanics.

According to embodiments, detecting user commands at block 125 can include detecting player data including one or more player controls and inputs to a user interface. According to embodiments, an electronic game 100 may be configured to present a user interface for receiving user input for electronic game preferences. Detected preferences may be used as player input for determining one or more game objects for presentation.

According to embodiments, processes are provided for generating game worlds and populating game worlds based on one or more of player interest and player actions within a game, such as in-game controls. By using player actions and player preferences, an electronic game may be presented based on player actions in the game. As such, player actions can be detected and used to effect one or more of game structure and game storyline. In addition, player interactions and input commands of multiple players may be detected and used to generate one or more of a game area and game storyline.

According to embodiments, electronic game 100 may be configured to provide features to improve user experience, wherein functions and operations described herein are performed following user consent, with express notice to a user, and/or in alignment with one or more user settings for user privacy. It should be appreciated that embodiments may be applied to interactive entertainment with one or more users. Processes described herein are not limited to gaming content. According to embodiments generative game world population may including performing one or more operations and processes discussed herein, such as process 200 of FIG. 2.

Figure 2:
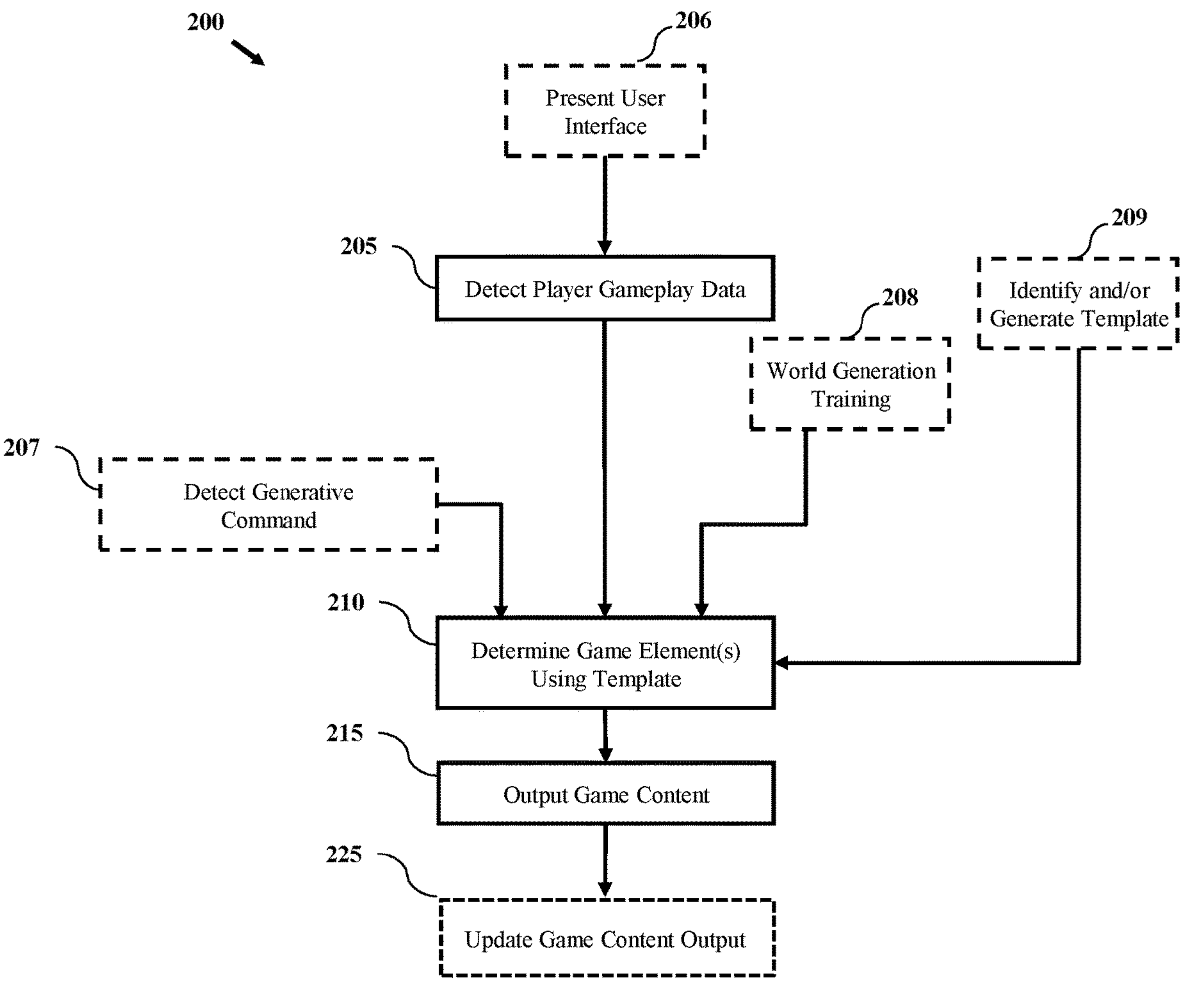
FIG. 2 illustrates a process for generative game world population according to one or more embodiments.

FIG. 2 illustrates a process for generative game world population according to one or more embodiments. Process 200 may be configured to generate one or more elements or configurations for electronic games, including a configuration of one or more existing elements of game elements and generating one or more new game elements and game areas. Process 200 may be performed by a device, such as device 305 and/or controller 325 of FIG. 3, for generative game world population. According to embodiments, process 200 may be configured to generate a game world that is customized based on player preferences obtained through one or more of a user interface (UI) and device observation of the player. Player preferences may be for a single player and/or for a combination or a group of players. The player preferences may be used to generate game content that is customized to provide the best game play for the group of players. Process 200 may also be configured for generative game world population based on a temple. According to embodiments, a process 200 may use a game world generation template providing one or more parameters or constraints for generating and/or populating game elements. By way of example, game elements may be generated using a nested template to provide different levels of detail. A template may be configured with hierarchical nesting to generate the game elements. Game world population using a template may include aspects of a game element that inherited from other game elements and/or that override aspects from the electronic game element.

Process 200 may be performed on electronic games (e.g., video games, interactive games, etc.). Electronic games may include one or more player controlled elements, a visual display or one or more levels or areas, and the ability of the user to control the character relative to one or more levels and areas. Electronic games may also include non-player elements such as non-player characters or playable game areas (e.g., routes), non-playable game areas, and various forms of displays. Games may include a storyline including character information such as a character backstory and one or more narrative components describing gameplay or the rationale for performing game tasks. These features may form or be part of a game standard. By way of example, a character storyline for a quest of a certain object may be a definitive feature and constraining factor when identifying generative features. Game standards may be described by data of the electronic game. Embodiments may include identifying and determining a game standard based on one or more of gameplay data and game engine data (e.g., game code).

Process 200 may be initiated by a device (e.g., device 305) detecting player gameplay data at block 205. Player gameplay data detected at block 205 may include user input controls, user commands (e.g., voice, user interface, etc.), user reactions and user preferences for one or more electronic games. Player data may be detected for at least one player of an electronic game. According to embodiments, detecting player data includes detecting in-game player interactions with elements of the electronic game. Detecting player data can include detecting input controls for a multiplayer game and identifying an in-game preference for the at least one player of the electronic game based on in-game player interactions with elements of the electronic game.

Figure 7:
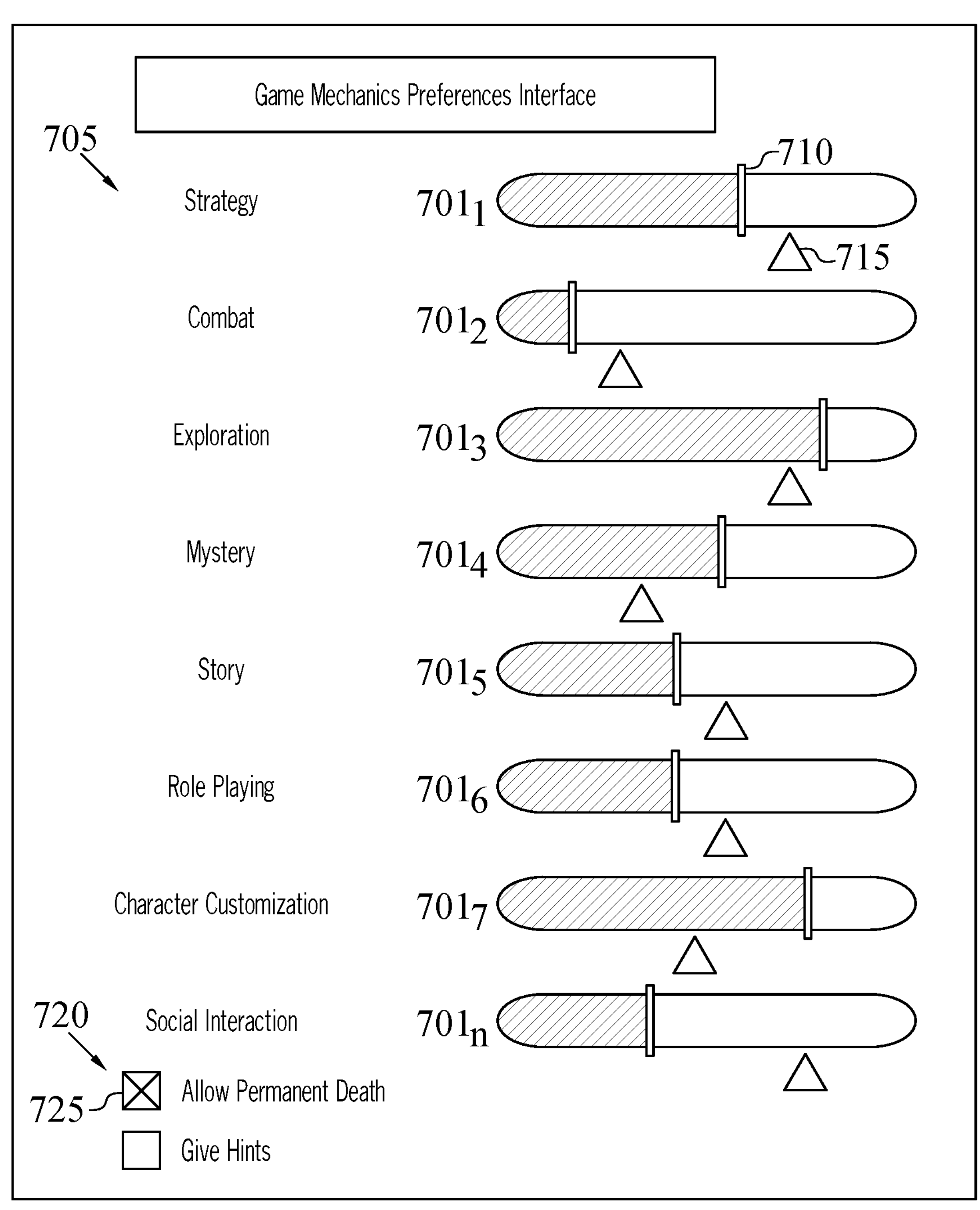
FIG. 7 illustrates a graphical representation of user interface control according to one or more embodiments.

According to embodiments, player gameplay data detected at block 205 may include detecting at least one input control for a user interface of the electronic game, the user interface including a plurality of graphical slider controls to define user preferences. Detecting player data can include detecting at least one input control to a user interface including at least one variable control input configured to define at least one game parameter. Using a variable control input may allow for a user to fine tune and adjust parameters used for generative game world population. According to embodiments, process 200 may optionally include presenting a user interface at block 206. FIG. 7 illustrates a graphic representation of an exemplary user interface according to embodiments. A user interface presented by process 200 may include one or more control elements for input of player input commands and/or variable control elements. Player input controls may provide inputs along one or more control dimensions and for one or more characteristics and control features including but not limited to a character customization level, combat level, story level, etc. As such the user interface may provide one or more values or values with reference to a scale that may be incorporated and used for generative game world population.

According to embodiments, process 200 may optionally include detecting a generative command at block 207. According to embodiments, a game world generation input command for an electronic game area may be detected by a device, such as one or more of a game console, network server and interactive entertainment device. A game world generation input command may be at least one of a game engine command, game design command, game server command and game player command to populate at least one element of a game session. Generative game world population can be performed at different stages of game development and/or for established games. During game development, a game input command can include generation of one or more of a game element for a game area and generation of a new game area. For established or existing electronic games, the generative game input command may be received during game play and/or in response to game play to generate one or more game elements for game areas. Similarly, the generation input command may be to initiate generation of a new game area or game storyline. The world generation input command may be detected based on game designer and developer input commands of a user interface for game design. For generated games, the world generation input command may be based on player controls or selections of a user interface and control panel for the electronic game. According to embodiments, a user interface presented at optional block 206 may be configured to detect user preferences and to receive user commands for generative game world population.

According to embodiments, process 200 may optionally include performing world generation training at block 208. Generative world population may be based on parameters of an electronic game. Electronic games may include characters, a theme and storyline. A device may receive electronic game data as a training input received by way of video data and/or game data (e.g., game code, game engine data, game generation data, etc.). Received video and game a data may be used to characterize a game and identify storyline and game components that complement or mesh with the features of the game.

World generation training may be performed to generate and/or train a game world generation model. The world generation model may be used to generate elements, areas, themes, templates and/or game features to populate a new game world. World generation training at optional block 208 may be based on features of electronic games and training data in general for characters, storylines, themes and video generation. According to embodiments, world generation training at optional block 208 may including training a model to generate elements and areas for an electronic game using elements, areas and characteristics of an electronic game. By way of example, for a racing game, the model may be trained based on the racing vehicles and race tracks to generate a new race vehicle and/or a new race track. For an adventure game, the model may be trained based on a player controlled character, game antagonist (e.g., villain, boss, enemy, etc.), landscape, levels, tools, and of game parameters in general. World generation training may include identifying one or more game standards for an electronic game.

According to embodiments, generative operations of process 200 may be used to create a collection of game content and have similar content grouped together to create or populate areas with them to give those areas a sense of consistency. Similarities can be determined by analysis of game content or by analysis of player reactions to or interactions with game content.

According to embodiments, generative operations of process 200 can be used to create content that is used for a whole game title, a game area shared by multiple players, game play by a single player, or within a single game play instance. In some cases, created content may start out with a narrow scope of availability, such as specific to a particular player, and then be made available more widely, such as in a particular shared game world, based on player reactions to the content that are deemed favorable. In some cases, content created for first player can be made available to a second player if the first player's reaction to the content is favorable. In some cases, if a certain number of individual players react favorably to created content, then the created content can be shared more widely, such as to populate in a game world accessible by any player.

According to embodiments, process 200 may optionally include identifying and/or generating a template at block 209. Game areas of an electronic game may include a template, such as game data identifying one or more constraints, rules and/or characteristics for a game area. By way of example, a location, such as a castle, may include a non-player character located in a particular location, such as a dungeon, of the castle. According to embodiments, a template characterizing one or more game characteristics may be detected in game data. Alternatively or in combination, a game template may be identified based on the game data and components to allow for generation or population of elements that conform to game features. At optional block 209, process 200 may optionally including identify or generate a template based on features of an electronic game for one or more areas. According to embodiments, generating a template may include detecting one or more element tags to identify elements that can be populated. Alternatively or in combination, generating a template may include identifying elements of an electronic game including player controlled objects, characters, non-player characters, game areas and game features in general. Based on features of the electronic game, one or more nested templates may be generated which include one or more layers and a hierarchical arrangement of layers describing game areas of the electronic game. Templates of an electronic game, including generated templates of existing game areas may be used to generated new game areas and new templates.

At block 210, process 200 includes determining at least one element for populating a game area of the electronic game using the player data and a template. Elements for populating a game world may be determined based on the in-game player interactions, player input controls and one or more selections of a user interface. According to embodiments, determining the at least one element can include detecting player data for at least one first player and player data for at least one second player, identifying a preference based on the player data for the at least one first player and the player data for the at least one second player, and generating the at least one element in a game area of the electronic game based on a player data.

Process 200 can learn from player preferences and/or observations of player gameplay to identify game elements that are engaging or enjoyable for the player. This information can be used by the generative population operations to create game content that is customized for the player based on what the player finds engaging or enjoyable about game play and/or a game title. According to embodiments, process 200 can identify player preferences from input to a user interface presented at optional block 206.

Process 200 may use a template for generative game world operations. The template may provide constraints for generating a game element from a template to ensure the element fits in with the enclosing game element, works with the game mechanics, and/or reflects player preferences. Process 200 may combine constraints from tags with constraints from a template when generating content, such as to customize the content generated by a template to satisfy constraints from tags of content in which the generated content will be located. According to embodiments, process 200 may use machine learning (ML) model to receive the template as input to generate game elements. The ML model may be configured to fulfill constraints of a template when generating game elements. Templates may be configured to specify boundaries of generative population including boundaries of the game area and subject matter boundaries for sourcing material. By way of example, boundaries may range from specifying a detail exactly, to giving bounds as to what is allowed or not allowed for a detail, to allowing ML models free range for determining a detail. Boundaries may be configured in the arrangement and structure of a template. According to embodiments, templates may be nested to include one or more sublayers, such that each game area includes at least one area. Nested templates can provide at least on constraint for generating a game area, game object in the game area and at least one subarea for the game area. Nested templates can include a plurality of sublayers, each sublayer providing a boundary for generation of a game element for the electronic game. According to embodiments, a template can include at least one nested layer and each nested layer of the template includes a constraint for generating the at least one element. In each nested layer, characteristics for an object may be defined. Templates can be updated, or new templates can be created based on analysis of player interactions with generated game elements. Accordingly, templates may be generated based on detected player data.

According to embodiments, determining the at least one element for populating the electronic game area at block 210 includes generating at least one of content for a new game area of the electronic game and a new storyline component of the electronic game. According to embodiments, generative game world population and generative AI may be used in many ways for populating a game world, such as by game designers, by a game engine, by a game server, or by game players. When used by a game engine or game server, generative AI can replace traditional procedural generation of game content to result in creation of unique game content that does not suffer from being seen as repetitive by players. When used by game designers, generative AI can be used to generate many possibilities for populating a game area, such as a game level, city, country, island, planet, space ship, building interior, or dungeon. Designers can choose an interesting one to use as a basis for new content and can pick and choose elements from different generated content to use. When used by a player in a game, generative AI can allow the creation of new unique content by the player, instead of the traditional method of duplication of a fixed set of building elements. In an open world game with player created content, processes and operations described herein can provide for a very rich and constantly evolving environment for players to explore.

According to embodiments, determining the at least one element includes selecting a template for populating the game area using the in-game player interactions, and populating at least one area of the game using the template. Determining the at least one element can include setting at least one style for the at least one element using the player data for at least one player. According to embodiments, generative population operations may generate content specifically for the players in a multi-player game environment, then content generated specifically for each player may be used in that game environment. In some cases, a player may interact with content that was generated specifically for another player. According to embodiments, content created by generative population operations can be used across multiple game titles. Created content can be generated by a game server or can be created locally on the device where a game is played. In addition, content that is created locally can be uploaded to a server for sharing.

According to embodiments, generative AI can be used to fill in an empty framework or template for a new game area. This can be used to ensure that what is generated is functional and consistent with other areas in the game title. According to embodiments, determining the at least one element for populating the electronic game area includes generating display elements for the at least one element in a newly generated game area, wherein the device uses a template generated for the electronic game to determine display attributes and game function of the at least one element. An electronic game may include use of a template for populating game areas, such as first template for a first game area or level, and a second template for a second game area of level.

According to embodiments, determining the at least one element includes generating an adaptive storyline for the electronic game based on the in-game player interactions. According to embodiments, determining the at least one element includes generating a new storyline for the electronic game based on the in-game player interactions, and inserting the new storyline into the electronic game. According to embodiments, determining the at least one element includes generating at least one of audio output and music output for the electronic game based on the in-game player interactions. According to embodiments, determining the at least one element includes generating a new game area for the electronic game using a game world generation model trained to generate the new game area based on the in-game player interactions to include new game content. Determining the at least one element includes generating a new challenge for the electronic game based on the player data and template. The new challenge may include one or more tasks or task qualifies (e.g., time to complete, amount to complete, score, etc.) for a player to complete.

According to embodiments, determining the at least one element includes setting at least one style for the at least one element using the template. According to embodiments, generative AI can be used to generate content for populating new game areas, which may be newly created, or may already exist in the electronic game and need to be populated, such as a newly accessed planet or island. An area in a game can be populated using the template to select and/or define a set of objects or descriptions to be used to guide generative AI in creating content for the area. By using generative AI to populate new game areas, a game can provide an endless unique game environment for a player to explore. By using a template, features may be generated while providing boundaries or constraints to maintain a desired style or feel of an electronic game.

According to embodiments, generative AI can be used to create new non-player characters (NPCs) in a game and give each one their own look, personality, and background. NPCs may have information of interest to the player and can be used to reveal information to the player to advance the game story line.

According to embodiments, determining the at least one element for populating the electronic game area includes generating at least one game object and at least one display characteristic to populate the electronic game area, and wherein determining the at least one element includes generating elements for a template of the game area. Process 200 may be configured to characterize a game area and elements determined may be based on a theme or style to apply to in game elements. By way of example, a first music or audio accompaniment may be selected for a game area that includes a in room, and a second music or audio accompaniment may be selected for an outdoor or nature theme of a game area. Game area elements, storyline elements and characters may be used to generate the appearance of a room, elements in the room and the room appearance style. Elements may be generated based on age appropriateness of players, such that a room or a bar may be modified to a café or restaurant based on player age level.

According to embodiments, a template may provide one or more constraints to for inheriting and overriding an object of the electronic game. By way of example, a template identify one or more game elements and indicate that a style, color scheme or representation, and use the identified feature to populate new elements. An image style of characters, such as a two-dimensional or three-dimensional configuration may be inherited to new objects when generated. According to embodiments, game templates may be generated or used for an electronic game which feature a particular character to override the character from one or more game areas. Templates may allow for inheriting and/or overriding one or more game features.

Process 200 includes outputting game data at block 215 with the at least one element for populating the game area. The generated game data may be output with the game data. For example, a background generated for the game may be inserted in pace of an existing background. Alternatively, a formatted object may be output with the generated formatting at least one element. Outputting game data for the electronic game includes display of the at least one element during a game session. Outputting game data for the electronic game includes output of the at least one element during a game session to a first player and a second player of the electronic game.

Process 200 may optionally include updating game content at block 225. Process 200 may be configured to update generative content based on one or more templates and game content of the electronic game. According to embodiments, generative game world population may be based on the electronic game content output. Accordingly, advancing to a different game area or level may initiate updating of generative game content.

Figure 3:
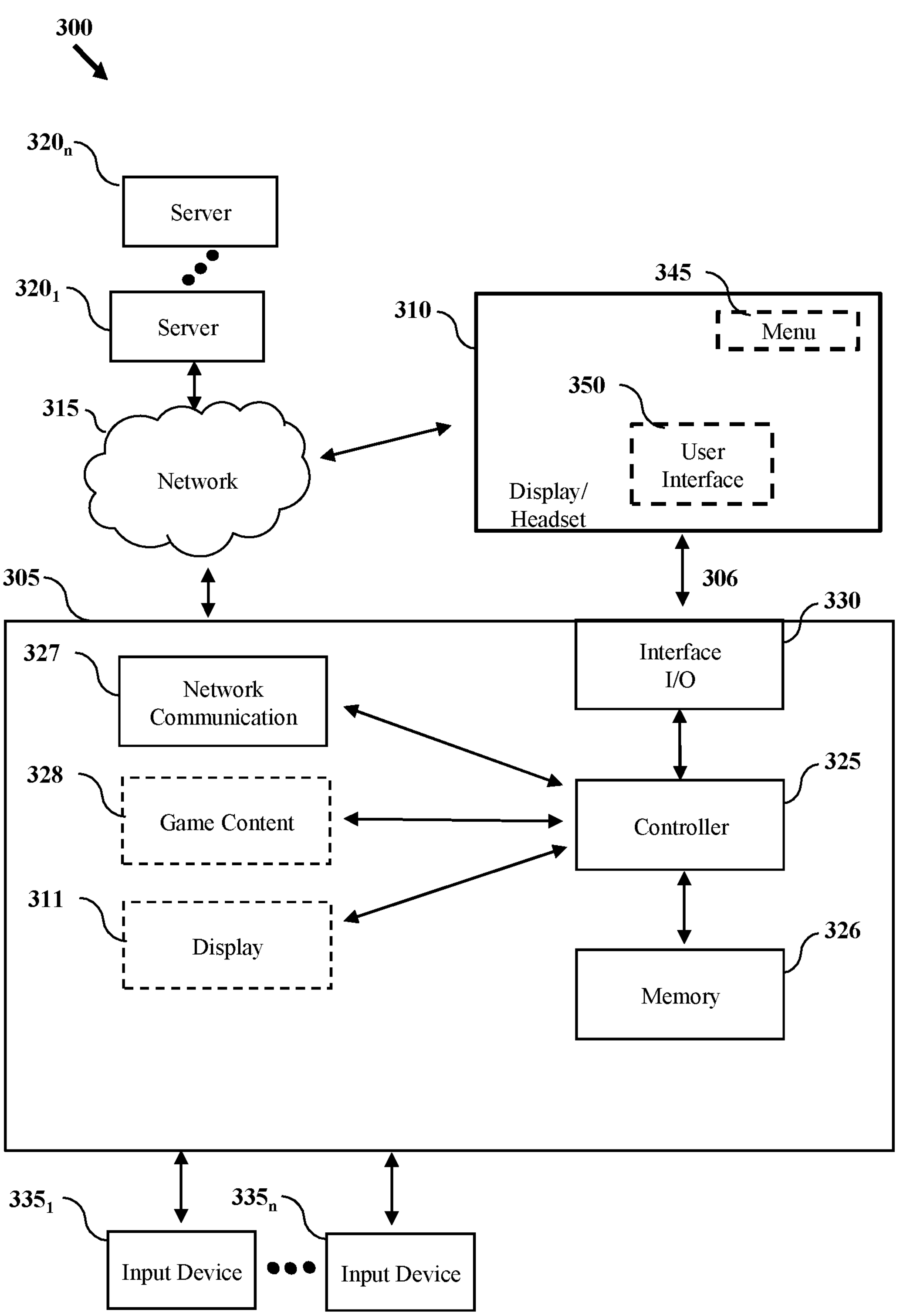
FIG. 3 illustrates a graphical representation of a system and device for game world generation according to one or more embodiments.

FIG. 3 illustrates a graphical representation of a system and device for identifying game world generation according to one or more embodiments. According to embodiments, game world generation may be performed and used by a device or a system, such as a network gaming system. A system can include one or more components and devices. FIG. 3 illustrates system 300 according to embodiments which can include device 305. Device 305 may be one or more of a gaming console, computing device and electronic device in general configured to output gaming content 306 to display 310 and may include output of generated game worlds and electronic game content. With respect to gaming content, device 305 may be configured to output data for presentation by a display, or visual output device in general, including graphics (2D and 3D), sound and data. Device 305 may also be configured to output non-gaming content, such as video content, visual content, audio content, etc. Embodiments describe generating generative game world population for electronic games and gaming, however it should be appreciated that the principles of the disclosure may be applied to other forms of media and non-gaming content. As such, device 305 and system 300 may be configured for generative operations that may be applied for one or more applications.

According to embodiments, device 305 is configured to output data 306 and/or content to display 310. According to embodiments, display 310 may be separate from or part of device 305. Device 305 may be configured for network communication by way of network 315 with one or more servers $\mathbf{320}_{1\text{-}n}$. Network communication can include one or more network communication type (e.g., Local Area Network (LAN), Metropolitan Area Network (MAN), Wide Area Network (WAN), Wireless, Inter Network (Internet). Device 305 may be configured to receive one or more of user data, game data and video data from servers $\mathbf{320}_{1\text{-}n}$. Servers $\mathbf{320}_{1\text{-}n}$ may be configured to store one or more of user data, game data and generative data.

FIG. 3 depicts a device configuration according to embodiments. Device 305 may relate to a console, media device, and/or handheld device. Device 305 may be configured to generate game data including configuring and populating existing game areas of a game, and generating new game areas for a game. Device 305 may be configured to perform one or more processes described herein for generative game world population. According to embodiments, device 305 includes controller 325, and memory 326. Device 305 may also include network communication module 327. Device 305 may also optionally include game content 328. Device 305 may optionally include a display 311 and/or may interoperate with display 310.

Controller 325 may relate to a processor or control device configured to execute one or more operations (e.g., executable instructions) stored in memory 326, such as processes for game world generation and game world population. Controller 305 may be coupled to memory 326, network communication module 327, and interface (I/O) 330. Memory 326 may be non-transitory memory configured to provide data storage and working memory operations for device 305. Memory 326 may be configured to store computer readable instructions for execution by controller 325 for one or more processes described herein. Network communication module 327 may be a communications module configured to receive and transmit network communication data.

According to embodiments, device 305 may be configured for generative game world population. According to embodiments, device 305 may be configured to detect a game world generation input command for an electronic game area. Device 305 may be configured to determine at least one element for populating a game area of the electronic game using the player data and a template, wherein the template includes at least one nested layer and each nested layer of the template includes a constraint for generating the at least one element. Device 305 may be configured to output game data for the electronic game area with the at least one element object.

According to embodiments, device 305 may be configured for generative game world population and player customization. Device 305 may be configured to detect player data for at least one player of an electronic game, wherein detecting player data includes detecting in-game player interactions with elements of the electronic game. Device 305 may be configured to determine at least one element for populating a game area of the electronic game based on the player data for at least one player, wherein the determining the at least one element is based on the in-game player interactions. Device 305 may be configured to output game data with the at least one element for populating the game area.

Device 305 may be configured to receive gaming media (e.g., card, cartridge, disk, code, data, etc.) and output visual and audio content of the gaming media to display 310. Device 305 may be configured to receive data from one or more of servers $\mathbf{320}_{1-n}$ to present and output game content 328, which may be stored in memory 326. For network games, device 305 may receive game data from a network source, such as servers $\mathbf{320}_{1-n}$, and may be configured to generate gaming music for the game data. Device 305 may similarly be configured to receive video content in general, including non-network game data, and output video content.

Device 305 may be configured to receive input from one or more peripheral devices, such as input devices $\mathbf{335}_{1-n}$. Input devices $\mathbf{335}_{1-n}$ may be controllers or input devices in general configured to provide controls for device 305 and game control.

System 300 may include display 310 for output of visual and audio of an electronic game and/or output of device 305. According to embodiments, display 310 may display control elements of device 305, such as optional menu 350, which may be used to interface with device 305. Display 310 may output user interface 350 received from device 305. Device 300 may utilize one or more operations of processes described herein. It should also be appreciated that system 300 and its components may be configured to perform operations of device 305.

Figure 4:
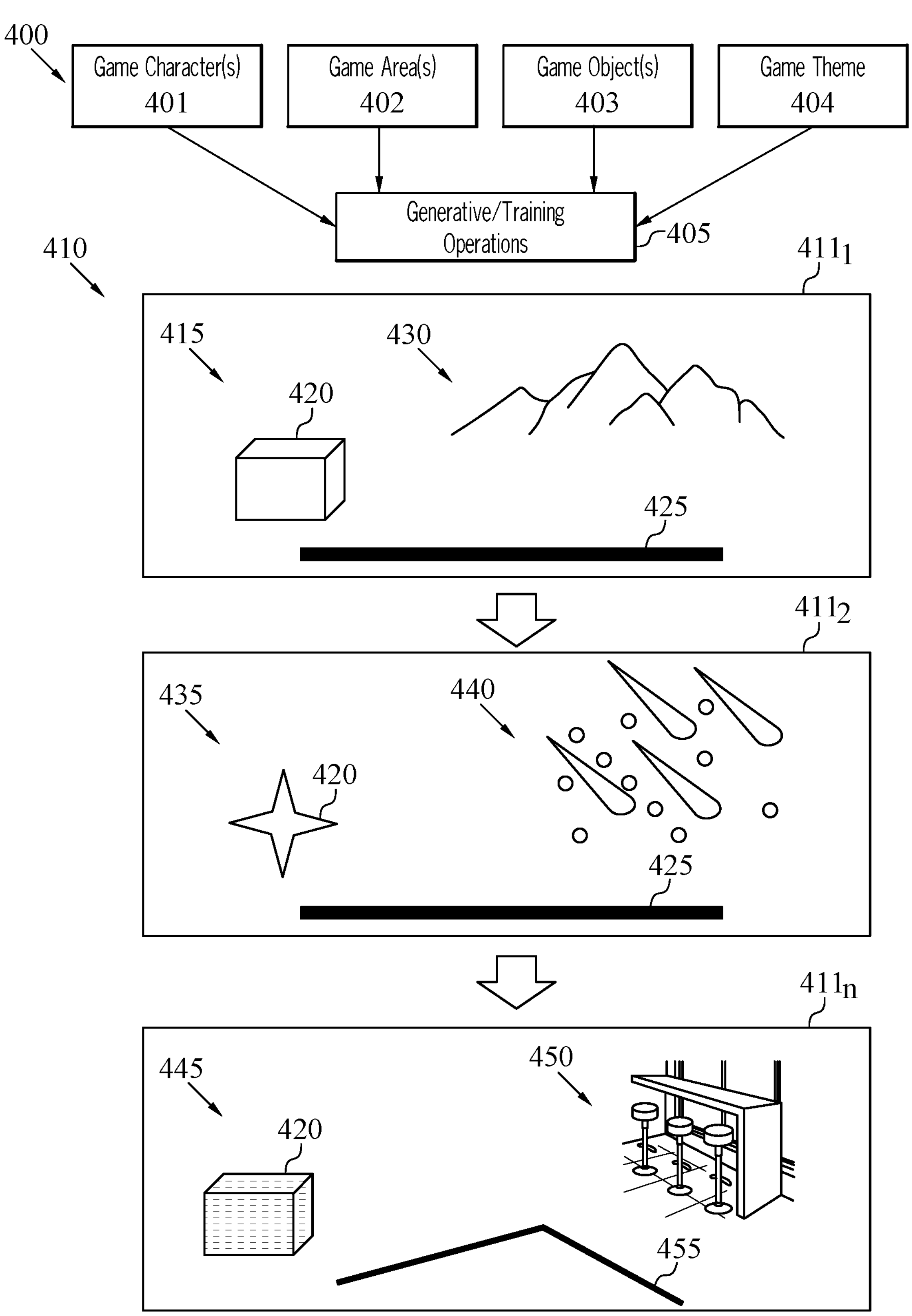
FIG. 4 illustrates a graphical representation of game world generation according to one or more embodiments.

FIG. 4 illustrates a graphical representation of game world generation according to one or more embodiments. According to embodiments, process 400 for generative game world population includes performing world generation training for a model and determining at least one element for populating the electronic game area using the model. In contrast to running a preprogrammed series of events or stages, embodiments provide operations and device configurations to generate one or more game elements, such as a game area, game object, game theme, etc. for an electronic game using at least one model. Training models may be configured to identify parameters from input, such as features of an electronic game, and generate one or more of configurations for the electronic game including configurations that are not preprogrammed. Game world population may include configuring preprogrammed elements, such as applying themes, however, it should be appreciated that generative game world population may include generation of new elements and/or areas in addition to and/or separate from preprogrammed electronic game data.

According to embodiments, process 400 can include receiving game content including one or more of data for game character(s) 401, data for game area(s) 402, data for game object(s) 403 and data for one or more game themes 404. Based on received game content process 400 may perform one or more generative and/or training operations 405. According to embodiments, training operations may be performed to train a generative game model to generate one or more of a character, game area, game object and game theme. Training operations at 405 may include identifying one or more game standards using one or more of game character(s) 401, data for game area(s) 402, data for game object(s) 403 and data for one or more game themes 404. Game standards may include one or more functional limitations. For example, a game standard may limit the control movements of a game object. Game standards may have design themes or display characteristics. For example, a game standard may limit the amount of background elements for a game area. Game templates may be identified from game data or generated from game data to include one or more game standards. Generative operations may include generating one or more of a character, game area, game object and game theme.

Generative and/or training operations 405 can include generating and/or training a game world generation model. The world generation model may be used to generate elements, areas, themes, templates and/or game features to populate a new game world. World generation training at block 405 may be based on features of electronic games and training data in general for characters, storylines, themes and video generation. According to embodiments, world generation training at block 405 may including training a model to generate elements and areas for an electronic game using elements, areas and characteristics of an electronic game. By way of example, for a racing game, the model may be trained based on the racing vehicles and race tracks to generate a new race vehicle and/or a new race track. For an adventure game, the model may be trained based on a player controlled character, game antagonist (e.g., villain, boss, enemy, etc.), landscape, levels, tools, and of game parameters in general. World generation training may include identifying one or more game standards for an electronic game.

According to embodiments, process 400 can include outputting game data 410 for the electronic game area with the at least one generated element. Outputting game data at 410 can include a plurality of game areas $\mathbf{411}_{1-n}$. According to embodiments, game area $\mathbf{411}_1$ may be output including background 415, configurable game object 420, game object 425 and theme element 430. According to embodiments, game area $\mathbf{411}_1$ may relate to a game area of an electronic game and generative world population may be configured to modify and/or generate one or more game elements for game area $\mathbf{411}_1$. Background 415 may include one or more ornamental and functional elements that may be modified. Configurable game object 420 may relate to a tagged element such that a device may be configured to modify one or more of the function and appearance of an object that is tagged. Game object 425 may be a game feature such as a barrier, path or landing feature. The arrangement of elements in game area $\mathbf{411}_1$ may be adjusted based on operations for generative game world population.

According to embodiments, generative game world population may include populating a game area and/or generating a new game element. Outputting game data 410 includes outputting at least one element in game area 4112. Game area 4112 may be generated to include background 430, configurable game object 420, game object 425 and theme element 440. According to embodiments, game area 4112 may relate to modified or updated version of game area $\mathbf{411}_1$. By way of example, game area 4112 may be modified to update at least one appearance and function of one or more game elements. Game area 4112 may include one or more updated elements of background 435 including theme elements 440 modified from game area $\mathbf{411}_1$. Configurable game object 420 may be updated to appear as having a modified graphical representation (e.g., a star representation for illustration of an appearance change) in game area 4112. Game object 425 may be presented as a game feature. According to embodiments, game area 4112 may relate to a graphical representation of a modified game area of an electronic game. According to other embodiments, game area 4112 may relate to a new area of an electronic game.

According to embodiments, process 400 can include outputting game data 410 for the electronic game area with the at least one generated element based on a game area template. According to embodiments, a game area template may identify one or more features or elements for populating a game world. According to embodiments, generative game world population may include populating a game area and/or generating a new game element for a plurality of game areas with a game area template. Outputting game data 410 includes outputting at least one element in game area 411$_n$. Game area 411$_n$ may be generated to include background 445, configurable game object 420, game object 455 and theme element 450. According to embodiments, game area 411$_n$ may relate to modified or updated version of game area 411$_1$. By way of example, game area 411$_n$ may be modified to update at least one appearance and function of one or more game elements. According to embodiments, game area 411$_n$ may relate to game area generated based on a template generated from game area 411$_1$. Game area 411$_n$ may include one or more updated elements of background 445 including theme elements 450 modified from game area 411$_1$. Configurable game object 420 may be updated to appear as having a modified graphical representation (e.g., display treatment) in game area 411$_n$. Game object 455 may be presented as a game feature having a modified appearance and function (e.g., change in shape defining change in controllable area). According to embodiments, game area 411$_n$ may relate to a graphical representation of a modified game area of an electronic game. According to other embodiments, game area 411$_n$ may relate to a new area of an electronic game.

According to embodiments, game areas 411$_{1-n}$ may relate to one or more game areas generated for an open world of an electronic game. Game areas 411$_{1-n}$ may be generated based on closed loop adaptive story learning and detection of electronic game elements. According to embodiments, elements of an electronic game may be detected and used as a reference for generative elements. Elements may be detected based on a player preference or interaction and used to custom fit game areas to one or more users. User preferences may be detected based on voice input or commands, such as speaking to a game console with an instruction to paint the background a color or convert a background to be a country themed saloon, a neon bar or city cafe. Unlike convention games with preprogrammed content, process 400 and processes described herein may generate game areas in user to user commands and requests. Generation of elements may interact with a game engine to allow for presentation on content and allow for gameplay.

Figure 5:
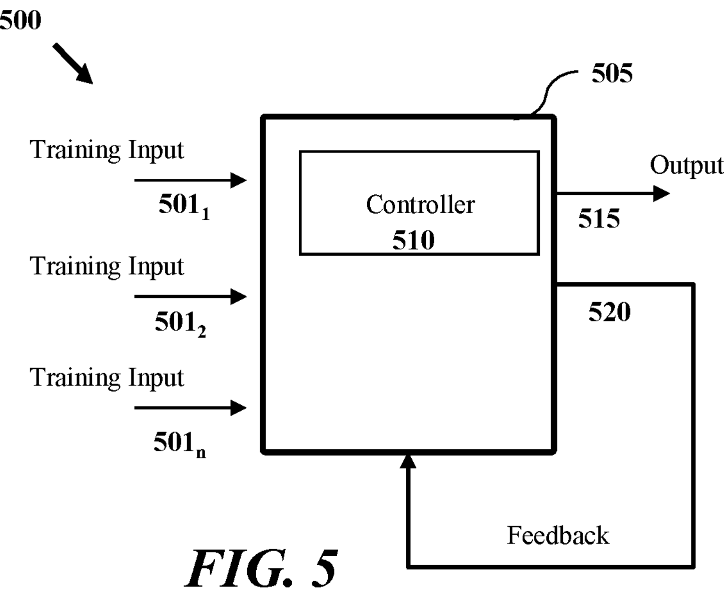
FIG. 5 illustrates a graphical representation of game world training according to one or more embodiments.

FIG. 5 illustrates a graphical representation of game world training according to one or more embodiments. According to embodiments, game world determinations may be performed using one or more references and models. Contextual information for objects, object function and object appearance may be determined based on a training process. FIG. 5 illustrates training process 500 which can include receiving training input 501$_{1-n}$ by a device 505 including a controller 510. According to embodiments, controller 510 may receive a plurality of gameplay videos and/or electronic game data for an electronic game as training input 501$_{1-n}$. In embodiments, training input 501$_{1-n}$ may relate to rendered video data for a particular electronic game and one or more additional electronic games. Training input 501$_{1-n}$ can include one or more references for storyline parameters. Training input 501$_{1-n}$ may include game engine data for one or more electronic games. Based on the training in process 500, controller 510 may generate output 515. Output 515 may include one or more determined objects, game areas, game storylines, electronic game modifications, new characters, character speech and elements for populating game worlds. According to embodiments, controller 510 may be configured to generate output 515 based on a recursive loop including training and feedback. Feedback loop 520 may provide information such as ratings and accuracy for output 515.

According to embodiments, training process 500 and controller 510 may be configured to use one or more learning models (e.g., artificial intelligence, iterative models, etc.) to recognize objects and elements in an electronic game. Training process 500 and controller 510 may use one or more libraries of common electronic game objects, including object images and object descriptions.

Figure 6:
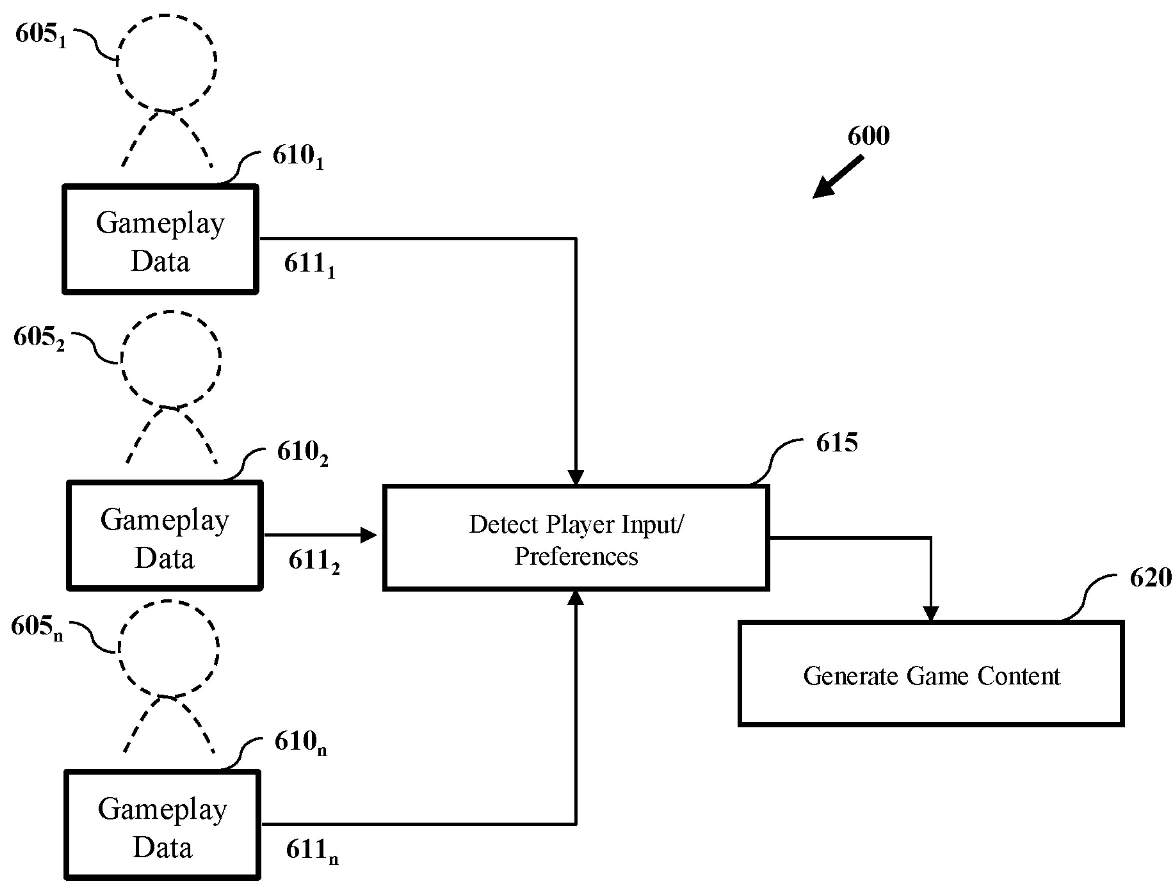
FIG. 6 illustrates a graphical representation of customizing game world generation for players according to one or more embodiments.

FIG. 6 illustrates a graphical representation of customizing game world generation for players according to one or more embodiments. According to embodiments, devices and processes are provided for generative game world population and player customization. Process 600 includes a plurality of gameplay data sources 610$_{1-n}$ associated with players 605$_{1-n}$ of an electronic game. Gameplay data sources 610$_{1-n}$ may relate to gameplay devices, such as game consoles, personal devices and computers configured to output player controls 611$_{1-n}$. Process 600 may include detecting in-game player interactions, such as player input controls and preferences at block 615. According to embodiments, game content may be generated at block 620 using detected player input and/or preferences at block 620. According to embodiments, processes and operations described herein may be performed by one or more control devices. Alternatively or in combination, processes and operations described herein may be performed by one or more servers.

FIG. 7 illustrates a graphical representation of user interface control according to one or more embodiments. User interface 700 may be presented by a device, such as a server, game console, media player and device in general for display to a user. According to embodiments, user interface 700 may include a plurality of input controls for player customization of an electronic game. User interface 700 may also provide a plurality of interface elements to obtain player data, including player preferences, for an electronic game. User interface may be presented by one or more of game system output, game code output and presentation to an auxiliary device, such as through a web browser on a computer or an application (app) on a mobile device.

User interface 700 is an exemplary representation of a graphical user interface. It should be appreciated that the principles of user interface 700 may be deployed to one or more other interface configurations. According to embodiments, user interface 700 includes input controls 701$_{1-n}$ and parameters 705. Input controls 701$_{1-n}$ may be variable controls for a plurality of game features. For example, input controls 701$_{1-n}$ may be sliders, where a user may control slider element 710 to a desired position to indicate the degree or amount of a parameter. According to embodiments, each of the input controls 701$_{1-n}$ may include a slider element 710 and a suggestion element 715 to indicate a suggested amount for each parameter. By controlling the position of a slider element a user may control the degree of influence of one or more factors. Suggestion element 715 may be configured to show a suggested value to a player, such as a value determined from a player profile or determined from machine learning operations on player game play. More than one suggestion indicator may be shown for a single parameter in user interface 700. According to embodiments, different parameters may show different numbers of indicators, different types of indicators and/or a key or help text to identify what is indicated by indicators that are shown.

According to embodiments, user interface 700 may include a plurality of parameters 705 for to allow a player to explicitly specify their preferences for the aspects they prefer in a generated game world. According to embodiments, a device may use a machine learning model to generate user interface based on features and data of an electronic game. By way of example, preference choices or elements of parameters 705 may be selected based on game data or metadata from a game world generation engine for what aspects can be customized based on player preferences. According to embodiments, certain standard elements may be determined by a game system, such as preferences to indicate the desire to compensate for certain accessibility issues, which can include hearing impairments or visual impairments.

Parameters 705 may include labels for type of preference in user interface 700. Parameters 705 may include a plurality of preference labels to label individual preferences. FIG. 7 for example illustrates parameters 705 including labels for strategy, combat, exploration, mystery, story, roleplaying, character customization and social interaction. Parameters 705 may include additional or different parameters. Parameters 705 may include multiple sections, that present the user with preferences for different aspects of the game world. A player may navigate to different sections in the user interface through various methods, such as hierarchical menus or tabs. The preferences presented to the player may contain any number of preferences, such as player preference for puzzles or separate difficulty levels for different aspects of game play. Parameters 705 may include additional elements for control, for example, accuracy needed for aiming, timing needed for aiming, easy of using stealth to evade detection, amount of damage dealt by enemies, or amount of strategy needed to defeat monsters.

According to embodiments, input controls $\mathbf{701}_{1\text{-}n}$ of user interface 700 are configured as sliders to allow a user to set a value along a sliding scale for a preference. Input controls $\mathbf{701}_{1\text{-}n}$ can allow a user to manipulate the position of slider element 710 directly, such as through left and right buttons or through dragging the indicator on the slider. Other implementations for sliders are possible, such as to have on screen buttons for adjusting the slider position. In some cases, a continuous range of input controls $\mathbf{701}_{1\text{-}n}$ can be limited to discrete values, such as integers from 1-10. According to embodiments, a numerical indication of a slider value of input controls $\mathbf{701}_{1\text{-}n}$ may be shown. Other user interface elements can be used to allow a player to specify a value in a range, such as a dial that rotates.

User interface 700 may include selectable elements 720 to allow for setting a preference value that is either on or off, such as check box 725. Selectable elements 720 may be configured to receive input to specify a value that is either on or off, such as sliding an indicator on a small slider. According to embodiments, user interface 700 may include other forms of input, such as indicating one or more values from a given set of values. Such a preference can be specified by using user interface elements such as a set of radio buttons or a drop-down list.

Figure 8:
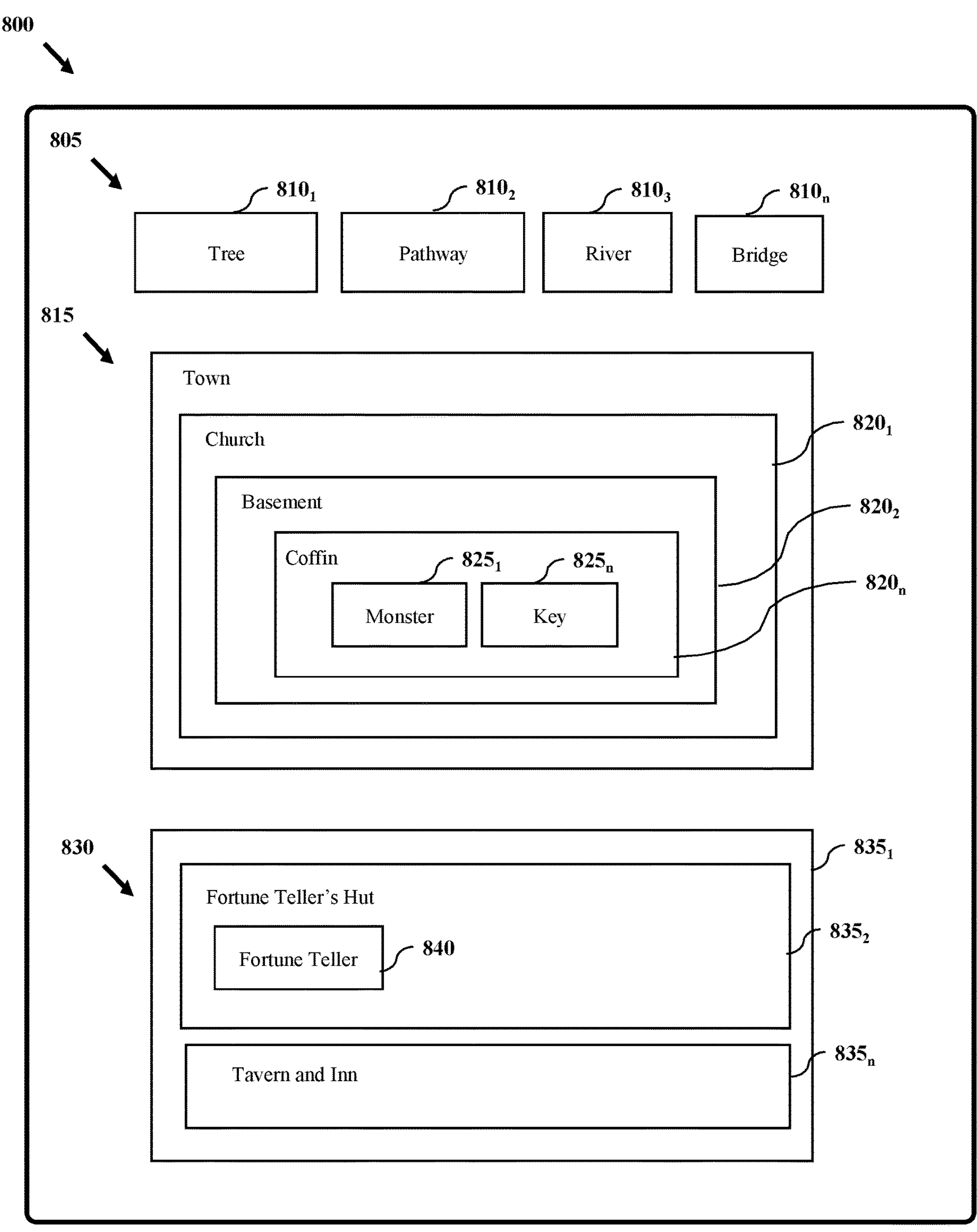
FIG. 8 illustrates a graphical representation of a game world template according to one or more embodiments.

FIG. 8 illustrates a graphical representation of a game world template according to one or more embodiments. According to embodiments, generative game world operations may be based on player data and templates for an electronic game. Template 800 may be a game world generation template providing one or more parameters or constraints for generating and/or populating game elements. Template 800 may be used to generate game elements. According to embodiments, template 800 may be a nested template configured to provide different levels of detail for game elements. Template 800 may be configured with hierarchical nesting to generate the game elements. Game world population using a template may include aspects of a game element that inherited from other game elements and/or that override aspects from the electronic game element.

According to embodiments, game elements can be nested inside of one or more layers of a template to provide different levels of details for generating game elements. Nested game elements can provide detail to game elements enclosed or located in a layer and layers may contain game elements within them to provide detail for element rendering. Each game element can define how it fits into the parent element in which it is nested, can define how the element interacts with elements in a layer and the parent element, and can define constraints for elements that are nested within the element. By way of example, story elements that identify elements that should be available, such as items, buffs, or knowledge, challenges that should be in the game element, physical size or dimensions the game element should occupy, difficulty level, target play times, mood to evoke in players, cultural and historical appropriateness, or information from player interactions, such as previous player interactions with NPCs, may be linked or stored within a layer or element of template 800. In addition, layers such as a top layer can define overall aspects that are inherited by nested game elements that do not overwrite those aspects.

According to embodiments, template 800 may be updated based on feedback from players, feedback aggregated from players in a game session, or an aggregate of players across the game title globally to adapt the template to generate the best play experience. According to embodiments, game elements identified as enjoyable by one or more players may be set as an element in a template for future adoption as a starting point.

According to embodiments, template 800 may be generated to provide a game level theme and to provide consistent style and feel across the whole game title. Game element themes can differentiate different game areas from each other, while still using themes from parent game elements to give consistency from one game area to another. In addition, templates for elements may impose certain restrictions to allow elements to work together, both within the enclosing element or layer, between elements contained in the same layer, and with a player. According to embodiments, constraints may include specific game elements that must be included in the game element that is generated. Templates may have portions that are populated by generative machine learning operations.

According to embodiments, template 800 may be generated to a game area to include game elements 805 and a plurality of layers 815 and 830. According to embodiments, game elements 805 include a plurality game elements parameters $\mathbf{810}_{1\text{-}n}$. Game elements parameters $\mathbf{810}_{1\text{-}n}$ may include one or more constraints for each identified game element. Game element parameters $\mathbf{810}_{1\text{-}n}$ may provide elements associated with a game area of a game world. For populating an existing game, game element parameters $\mathbf{810}_{1\text{-}n}$ may be used as a source or elements to populate a game area or as a reference for elements to generate.

According to embodiments, template 800 may be nested to include one or more sublayers, such that each game area includes at least one area. Nested templates can provide at least on constraint for generating a game area, game object in the game area and at least one subarea for the game area. Template 800 may be a nested templates including plurality of sublayers, each sublayer providing a boundary for generation of a game element for the electronic game. According to embodiments, a template can include at least one nested layer and each nested layer of the template includes a constraint for generating the at least one element. In each nested layer, characteristics for an object may be defined. Templates can be updated, or new templates can be created based on analysis of player interactions with generated game elements. Accordingly, templates may be generated based on detected player data.

FIG. 8 illustrates an example for nesting of templates for generating game elements that are nested based on the nesting of the game templates. For purposes of explanation, template 800 may relate to a top-level template for a forest game area, including game element parameters $\mathbf{810}_{1\text{-}n}$ and layers 815 and 830. Templates as used herein may include additional nested layers to produce more game elements. According to embodiments, generation of a game area may be performed using a template such as template 800. Template 800 may be selected to generate a game area (e.g., forest, etc.), and template 800 may be a top-level template for the game area being generated. The size and boundaries of a game area may have been based on parameters of an electronic game such that template 800 may be used to populate a game area of a game map with one or more of game element parameters $\mathbf{810}_{1\text{-}n}$. In the example of a forest, game element parameters $\mathbf{810}_{1\text{-}n}$ includes elements for a tree, pathway river and bridge as examples.

According to embodiments, template 800 may provide information as to types of elements for populating a game area and may also provide configurations of the elements. Game element parameters $\mathbf{810}_{1\text{-}n}$ may include be used to specify display format and presentation. By way of example, when using template 800 to generate a forest, elevations of the land along the boundary of game element parameters $\mathbf{810}_{1\text{-}n}$ may be specified. Template 800 may also provide specifications of elements that must be present in game area (e.g., game element $\mathbf{825}_n$ in sublayer $\mathbf{820}_n$). In addition to display objects, template 800 may include specifications for a game area to include information about the types and number of challenges to include.

According to embodiments, generative game world population using template 800 may include generating a game element for all game elements 805 of template 800. Generative game world population using template 800 may include generating a game element for all layers of template 800. Generation of the game area may then include populating a game area to include elements for layer 815, including sublayers $\mathbf{820}_{1\text{-}n}$ and for layer 830, including sublayers $\mathbf{835}_{1\text{-}n}$. in the example of FIG. 8, layer 815 may be for a town and includes sublayer $\mathbf{820}_1$ for a Church, sublayer $\mathbf{820}_2$ for a basement and sublayer $\mathbf{820}_n$ for a coffin. The description of sublayers is exemplary. In the context of a game, sublayers $\mathbf{820}_{1\text{-}n}$ such that sublayer $\mathbf{820}_2$ is within sublayer $\mathbf{820}_1$. By nesting layers, attributes of elements may be passed up or down layers. In addition, the sublayer order may provide a description of element arrangement in an electronic game. For example, a lower level sublayer may be used to provide elements for a particular part of a game area, whereas a high level sub area may be used to provide elements over a larger game area. Embodiments may use templates with different configurations and templates may be configured to provide generative game world areas for a variety of game types.

According to embodiments, layer 815 includes a plurality of layers, where sublayer $\mathbf{820}_n$ includes elements $\mathbf{825}_{1\text{-}n}$ for a monster and key respectively. Arrangement of elements $\mathbf{825}_{1\text{-}n}$ in sublayer $\mathbf{820}_n$ may relate to generation of the elements in the game when a character arrives at a location in the game for a game area associated with sublayer $\mathbf{820}_n$. Template 800 also includes layer 830 including sublayer $\mathbf{835}_1$ for a game area and sublayers $\mathbf{835}_2$ for a fortune tellers hut include fortune teller element 840 and sublayer $\mathbf{835}_n$ for a game area associated with a Tavern and Inn. According to embodiments, generative game world operations may populate the characteristics of sublayers $\mathbf{835}_2$ for a fortune tellers hut include fortune teller element 840. For and sublayer $\mathbf{835}_n$ generative game world operations may determine the elements to include in the Tavern and Inn based on the title or name of the sublayer.

According to embodiments, generative game world population using template 800 may include generating a game area to include inheriting certain attributes from the game, such as the rendering style (e.g., photorealistic), the art theme (e.g., medieval), the lighting, or the color pallet from the game element in which it is being rendered. Other attributes can include things such as distressing to make things look old, worn, or damaged. Parameters and elements for inheriting elements may be provided by game elements 805. According to embodiments, a top-level layer or sublayer may enclose or constrain generated elements. By way of example, template 800 may relate to a top-level template for a forest game area. Aspects of an enclosing or higher level game element may be inherited by one or more game elements, such as the rendering style, art theme, musical motifs, and music style. According to embodiments, aspects of game elements may be overwritten from aspects of the enclosing game element, such as the lighting and color pallet. By inheriting aspects from the enclosing game element, elements may be generated with a style, appearance or feeling consistent with the enclosing game element. According to embodiments generative game world population may include overriding aspects from the enclosing game element. As such, elements may be generated with a feeling of being unique and/or adding variety to a game. By way of example, a forest may be generated with a dark and gloomy mood compared with a surrounding game element to provide a unique look and feel.

According to embodiments, generative game world population using template 800 may include generating elements specific to a template. For example, with template 800 configured as a forest template, template 800 may specify the types and quantities of plants, including trees, that are present in the forest. Specifying type and number of elements can provide a consistent look and feel while allowing a different forest game area to have a different look and feel. In this example, a single tree may be included in the forest using game element parameter $\mathbf{810}_1$, and the template may be determined to include game element parameter $\mathbf{810}_2$ as a pathway, game element parameter $\mathbf{810}_3$ as a river, and game element parameter $\mathbf{810}_n$ as a bridge. According to embodiments, operations described herein, such as machine learning operations, can determine constraints for template 800 including a location within a game are and/or a location within a layer or sublayer of template 800. By way of example, operations may include specifying the location of a game element in a layer (e.g., key $\mathbf{825}_n$ in sublayer $\mathbf{820}_n$).

An element that can be moved may move outside of the bounds of the parent element in which it was generated, such as an adventurer picking up a sword that was generated in a castle element and walking out of the castle carrying the sword or a ship that was generated in a lake element can sail down a river out of the lake.

According to embodiments, game world population using a template may performed from a top-down perspective, starting with the top-most template to render, then rendering the templates for enclosed game elements-elements within a layer or one more sublayers of the template. Enclosed templates may be determined while rendering the parent template. According to embodiments, constraints on enclosed templates may be determined while rendering a game template. Generation of game elements may start with using a template that is enclosed within another template, such as to generate a dungeon room before the dungeon is generated. An advantage of generating sublayers may be that the size and shape of the dungeon room can be determined before determining the layout of the dungeon. In some cases, a combination of top-down and generating a child template first can be used, such as to identify sublayer or child templates to include in a dungeon, then create game elements for the templates, and then finish the generation of the dungeon to ensure that the generated elements fit together with final sizes and shapes. In some cases, a more iterative process can be used including multiple rounds of between a parent template providing constraints and a child template that provides feedback to the parent template. By way of example, as elements are generated, such as for a room from a template, feedback can be sent to the enclosing template to make the room larger to better accommodate all of the things to fit into the room.

Figure 9:
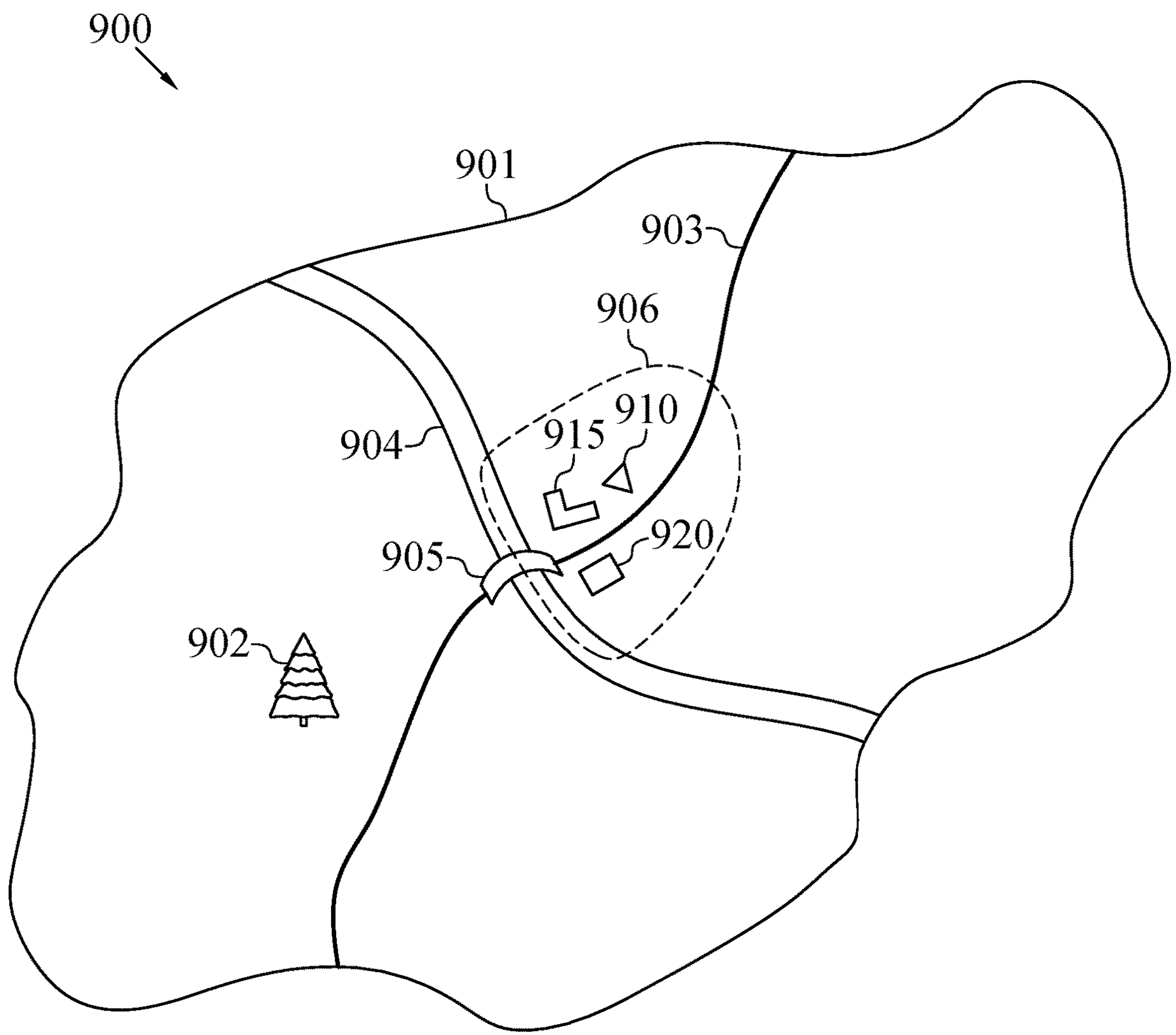
FIG. 9 illustrates a graphical representation of a game world map according to one or more embodiments.

FIG. 9 illustrates a graphical representation of a game world map according to one or more embodiments. Game world map 900 may relate a game area of an electronic game including one or more generative game world elements. According to embodiments, game world map 900 may include one or more areas of an electronic game, including the entire map, generated based on generative game world population. Game world map 900 include elements generated from at least one template, such as template 800 of FIG. 8.

Game world map 900 includes a game area generated for forest 901 and a plurality of game elements, such as tree 902, pathway 903, river 904, bridge 905 and town 906. According to embodiments, game elements of game world map 900 and forest 901 may be generated based on one or more operations for game world population. By way of example, operations may be performed for an existing area, as such one or more of game world map 900 and forest 901 may be elements of an existing game. Alternatively or in combination, one or more of game world map 900 and forest 901 may be new elements generated for a game. One or more of the location of elements in game world map 900 and the characteristics of elements may be determined based on one or more machine learning (ML) operations. Elements of game world map 900 are exemplary, however it should be appreciated that processes and device configurations to generate game world map and/or populate elements may be applied to other game areas.

According to embodiments, game world population can include inheriting characteristics of a game area to constraints or rules. According to embodiments, pathway 903 may be a game element (e.g., game element parameter $\mathbf{810_2}$) generated to create controllable area for a game element such as a character. Determining pathway 903 may include generating a game element that connects two points on the bounds of forest 901, the pathway intersect the bounds. Generating pathway 903 may include taking into account the elevation of game area of forest 901, such as land attributes the forest 901 when determining where to route the pathway. Accordingly, determining pathway 903 can include avoiding going straight up a steep hillside. Although only a single pathway 903 is shown through forest 901, game world population as described herein may include generating additional pathways in forest 901.

According to embodiments, game world population can include generating elements according to constraints or rules of a game area and to include characteristics, such as sound elements, to comply with a game area. Tree 902 may be generated based on the game area 901 having a title or description as forest. River 904 may be determined as a game element and created to connect two points on the bounds of forest 901, river 904 intersecting the bounds. When determining a route for river 904, such as from the point where it flows into forest 901 to the point where it flows out of forest 901, determining the river route may include routing the river so that it never flows uphill. While only a single river 904 is shown through forest 901, generative game world population as described herein can include generating additional bodies of water, such as a lake or stream that flows into the river. Determining game elements for game world map 901 and game areas can include determining audio for the elements, which can be based on the template to generate the game element. For example, river 904 may be configured to emit one or more sounds of water flowing over rocks, which may be louder and sound different from a portion of the river that flows down a steeper rocky slope.

According to embodiments, game world population can include generating elements according to constraints or rules, such as characteristics of a generated element. For example, pathway 903 crosses river 904 and generative game world operations may create a bridge 905 for pathway 903 to cross over river 904. According to embodiments, generation of the bridge my impart game mechanics to the generated element such that during game play crossing river 904 may be more difficult, or impossible, when attempted in a location other than the bridge. Another example of generating elements according to constraints or rules, such as characteristics of a generated element may be to create a town 906 in the forest. Generative operations may include using a characteristic of existing towns, such as locations towns are traditionally built, when determining location of town 906, such as at or near an intersection of pathway 903 and river 904 to provide access to both transportation and a water supply. Conversely, if a characteristic of generating town 906 is to be a secret or lost ghost town, operations and characteristics determined for the town may be a location far from pathway 903.

According to embodiments, game world population can include generating elements including controlling the number of generated elements. By way of example, when rendering town 906 for game world map 900, three buildings may be generated, including fortune teller's hut 910, church 915 and Tavern & Inn 920. In town 906, buildings in forest 901 are all located along pathway 903. Operations can include generating elements within a proximity to game pathways, such as pathway 903. Embodiments can include generation of additional elements for structures.

According to embodiments, populating a game world can include generating a location, information to be shared by an NPC and characteristics for an NPC. By way of example, a fortune teller located in fortune teller's hut 910 may be an NPC that a player can meet in fortune teller's hut 910. The NPC may be available to meet any time the player enters the hut. An NPC, such as the fortune teller may only be available at particular times, such as a time of day, or after making an appointment with the bartender in tavern & inn 920. The fortune teller may be generated to allow a player to obtain particular information through interacting with the fortune teller and may not immediately give up the information but may let the player know they can obtain the information after performing a task, such as obtaining an item for the fortune teller.

Game world map 901 and game areas can be created to include one or more NPCs, such as citizens in the town. These other NPCs may act in particular ways and provide information, such as local history, to give the town or game area a richer and more immersive feel. Tavern & Inn 920 is an example of a game element that can be included by the generative operations to provide common items associated with the element type. For example, Tavern & Inn 920 can include food, lodging, and the ability to interact with NPCs. Similarly, church 915 may be generated with a constraint that a key is available for player to obtain within church 915. Church 915 may include a basement with a constraint is passed through to when church 915 is rendered. When a basement of church 915 is rendered, the constraint to make key available may be passed through another game element, such as a coffin. A constraint to include a monster to protect a key may be included with the constraint to include the key. In some cases, a constraint to include a challenge to protect a key may be included with a constraint to include key, which may include details such as a type of challenge and difficulty level. In some cases, a constraint is not generated for including a challenge to protect a key. Generating challenges may include information on the types and quantities of challenges to include, desired difficulty level, and player preferences. Player preferences may be determined by analysis of player actions, direct specification by a player using a user interface (UI), or a combination of both.

According to embodiments, game elements may be rendered with and/or without using a template. For example, when rendering a game element from a template, game elements that are standard game elements or copies of other game elements that have been generated can be used without requiring creation of a new element. In other words, game elements may be copied, with and without modification, into a template to populate a game world. For example, the fortune teller's hut 910 may contain game elements such as a table and chairs, one or more of the hut, table and chairs may be copied from existing game elements. Existing game elements may be standard game elements that are part of the game title or may be game elements that were generated from a template. When copying an existing game element, the copy may be customized to better fit into the generated game element, such as to distress the game element to make it look older, change the size of the game element, or apply textures to the game element to make it look like it belongs, such as to make it look like it is ornately carved wood, brick masonry, or crude iron work.

According to embodiments, generative game world population can include determining one or more challenges or tasks for players. Challenges can be customized to a group of players, such as those adventuring together, or those playing against each other in a tournament or multiplayer game. Customization of game tasks and challenges can be based on skills or actions that would be required to defeat the challenge, skills or actions players can perform, desired difficulty, and player preferences. Some challenges may require multiple players to work together to defeat the challenge, such as to press a button at one end of the room while sliding a panel on the other end of the room. In some cases, the players working together may need different skill sets, such as a character with an ability only available to characters of a monk class and a character with an ability only available to characters of a wizard class. Challenges may be chosen based on other factors, such as expected time it would take to complete the challenge, physical size of the challenge, or number of challenges to present in an area.

According to embodiments, challenges can be customized to have a difficulty level that is appropriate for the player or players facing the challenge. The difficulty level of a challenge can also take into account the magnitude of the reward that can be received for defeating the challenge. For example, the challenges protecting the final treasure hoard of a dungeon may have a higher difficulty than the challenges along the way through the dungeon. The difficulty level of challenges can take into account the particular skills and abilities of the player or players facing the challenge.

Generating challenges for groups of players may include generating at least one challenge for each player. Difficulty level of the challenge may be controlled and players may be required to work together to overcome the challenges, such as having a first player take a first action while a second player takes a second action. These actions may be adjusted to the party such that the first action requires a skill that only the first player's character is capable of while the second action requires a skill that only the second player's character is capable of. By generating a dungeon area that is customized to a party of characters in such a way it can make the game play more enjoyable for all the players. According to embodiments, generating game world map 900 may include controlling one or more of difficulty, game mechanics, and rendering to accessibility preferences of one or more player, cultural preferences, hearing impairments, visual impairments, motor skill impairments, or attention impairments.

Generating challenges for groups of players may include generating more than one challenge to provide access to a game element, such as a key. Generative operations may create challenges other than a monster, such as to have a lock or latch keeping a coffin or game area closed that requires the player to align portions of the locking mechanism to open the coffin, find an item, such as a crowbar. Depending on game mechanics and player abilities, a trap may or may not be able to be detected by a player and may or may not be able to be disarmed by a player. Generative operations can include using multiple templates applied to the same game element. For example, a coffin template and carved stone item template, could both be used to generate a game element for a coffin.

According to embodiments, generative game world population can include determining one game element characteristics based on one or more of player preferences, strengths, and abilities. For example, a monster may be created such that the monster provides the appropriate difficulty level to the player or party of players. In some cases, the monster is determined based on the type of challenge that is desired, such as players needing immunity to poison or antidotes. In some cases, a monster is determined to provide practice or experience using a particular game mechanic that is needed to effectively fight the monster. In some cases, a monster is determined based on what can be obtained by defeating the monster, such as a particular type of leather that can be used for crafting.

While this disclosure has been particularly shown and described with references to exemplary embodiments thereof, it will be understood by those skilled in the art that various changes in form and details may be made therein without departing from the scope of the claimed embodiments.

What is claimed is:

1. A method comprising:

outputting, by a device, gaming content of an electronic game;

receiving, by the device, user input interacting with the electronic game;

identifying, by the device, based at least in part on the user input, a first constraint for generating a first game element of the electronic game;

generating, by the device, based at least in part on the first constraint, a first game element;

modifying, by the device, the gaming content to generate a modified gaming content including the first game element; and outputting, by the device, the modified gaming content.

2. The method of claim 1, wherein receiving user input includes receiving at least one input control for a multiplayer game and identifying an in-game preference for at least one user of the electronic game based on in-game user interactions with elements of the electronic game.

3. The method of claim 1, wherein receiving user input includes receiving at least one input control for a user interface of the electronic game, the user interface including a plurality of graphical slider controls to define user preferences.

4. The method of claim 1, wherein receiving user input includes receiving at least one input control to a user interface including at least one variable control input configured to define at least one game parameter.

5. The method of claim 1, wherein the first constraint provides at least one boundary, parameter, or rule for generating a game area, game object in the game area, and at least one subarea for the game area.

6. The method of claim 1, wherein the first constraint provides at least one boundary for generation of a game element for the electronic game.

7. The method of claim 1, wherein generating the first game element includes setting at least one style for the first game element using a template, wherein the template provides at least one of inheriting and overriding an object of the electronic game.

8. The method of claim 7, wherein the template is based on user input.

9. The method of claim 1, wherein generating the first game element includes generating a new challenge for the electronic game based on the user input.

10. The method of claim 1, wherein outputting the modified gaming content includes outputting the first game element during a game session to a first user and a second user of the electronic game.

11. A device comprising:

a processor; and a memory coupled to the processor, the memory storing executable instructions, which when executed by the processor, cause the processor to;

output, by a device, gaming content of an electronic game;

receive user input interacting with the electronic game;

identify, based at least in part on the user input, a first constraint for generating a first game element of the electronic game;

generate, based at least in part on the first constraint, a first game element;

modify the gaming content to generate a modified gaming content including the first game element; and output the modified gaming content.

12. The device of claim 11, wherein receiving user input includes receiving at least one input control for a multiplayer game and identifying an in-game preference for at least one user of the electronic game based on in-game player interactions with elements of the electronic game.

13. The device of claim 11, wherein receiving user input includes receiving at least one input control for a user interface of the electronic game, the user interface including a plurality of graphical slider controls to define user preferences.

14. The device of claim 11, wherein receiving user input includes receiving at least one input control to a user interface including at least one variable control input configured to define at least one game parameter.

15. The device of claim 11, wherein the first constraint provides at least one boundary, parameter, or rule for generating a game area, game object in the game area and at least one subarea for the game area.

16. The device of claim 11, wherein the first constraint provides at least one boundary for generation of a game element for the electronic game.

17. The device of claim 11, wherein generating the first game element includes setting at least one style for the first game element using a template provides at least one of inheriting and overriding an object of the electronic game.

18. The device of claim 17, wherein the template is based on user input.

19. The device of claim 11, wherein outputting the modified gaming content includes outputting the first game element during a game session to a first user and a second user of the electronic game.

20. One or more non-transitory computer-readable media storing computer-readable instructions that, when executed by one or more processors, cause a system to perform operations comprising:

outputting gaming content of an electronic game;

receiving user input interacting with the electronic game;

identifying based at least in part on the user input, a first constraint for generating a first game element of the electronic game;

generating based at least in part on the first constraint, a first game element;

modifying the gaming content to generate a modified gaming content including the first game element; and outputting the modified gaming content.

* * * * *